(12) United States Patent
Matsumoto (10) Patent No.: US 6,584,127 B2
(45) Date of Patent: Jun. 24, 2003

(54) LIGHT EMITTING DEVICE (75) Inventor: Kenji Matsumoto, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/732,743

(22) Filed: Dec. 11, 2000

(65) Prior Publication Data
US 2002/0009105 A1 Jan. 24, 2002

(30) Foreign Application Priority Data
Dec. 9, 1999 (JP) ............................. 11-349728

(51) Int. Cl.⁷ .................................. H01S 3/04
(52) U.S. Cl. ........................................ 372/34
(58) Field of Search ............... 372/34, 38.01–38.09, 372/29.02–29.023, 29.01–29.016, 75

(56) References Cited

U.S. PATENT DOCUMENTS 5,754,574 A * 5/1998 Lofthouse-Zeis et al. ..... 372/34

FOREIGN PATENT DOCUMENTS

JP 8-17106 1/1996 ......... G11B/15/467

OTHER PUBLICATIONS

Abstract, 08–017106, Jan. 19, 1996.

* cited by examiner

Primary Examiner—Quyen Leung
(74) Attorney, Agent, or Firm—Sughrue Mion, PLLC (57) ABSTRACT A light emitting device includes a solid-state laser. A pumping light source emits pumping light for pumping the solid laser medium. An automatic temperature controller includes a temperature control element which controls the working temperature of the pumping light source to a target working temperature, a temperature sensor which detects the working temperature of the pumping light source, and a temperature control circuit which controls the temperature control element on the basis of the temperature detected by the temperature sensor so that the working temperature converges on the target working temperature. An automatic light output controller includes a driver which supplies pumping energy to the pumping light source and a light output control circuit which increases and reduces the pumping energy supplied by the driver to the pumping light source according to a photo-detecting signal representing the light output of the solid-state laser so that a desired light output is obtained. A target working temperature setting unit changes the working temperature of the pumping light source with the light output fixed, and obtains an optimal working temperature at which the pumping energy is optimized on the basis of the relation between the pumping energy and the working temperature when the working temperature is changed with the light output fixed, and sets the target working temperature, to the optimal working temperature.

19 Claims, 6 Drawing Sheets

PRIOR ART

LIGHT EMITTING DEVICE

BACKGROUND OF THE INVENTION

1. Field of the Invention

This invention relates to a light emitting device using a solid-state laser, and more particularly to a light emitting device which is provided with an automatic light output control function together with a function of operating the solid-state laser and/or the pumping light source at an optimal temperature.

2. Description of the Related Art

There has been known a solid-state laser in which a solid laser medium doped with a rare-earth metal such as neodymium is pumped with pumping light emitted from a pumping light source such as a semiconductor laser. Further, there has been known a light emitting device obtained by combining such a solid-state laser with a nonlinear optical crystal so that the fundamental wave oscillated by the solid-state laser is converted to a second harmonic which is a half of the fundamental wave in wavelength.

In the light emitting devices described above, the properties of the solid laser medium, the nonlinear optical crystal and the semiconductor laser have great temperature-dependency and accordingly, at least a part of these components must be held at a constant temperature in order to stabilize the light output of the light emitting device.

Figure 3:
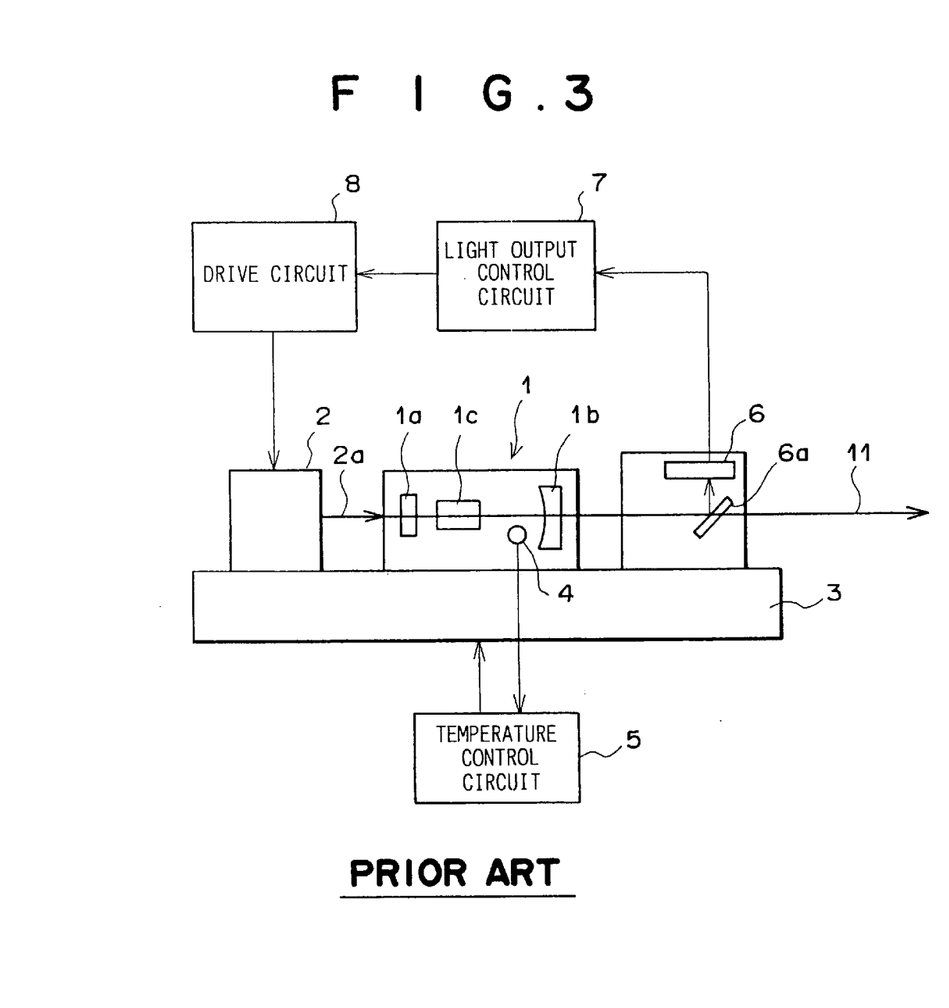
FIG. 3 is a schematic side view illustrating a conventional light emitting device.

Specifically, as shown in FIG. 3, the light emitting device is generally provided with the following first and second means in addition to a solid-state laser unit 1 comprising a solid laser medium 1a, a resonator mirror 1b, a nonlinear optical crystal 1c and the like and a pumping light source 2 such as a semiconductor laser which emits pumping light 2a.

The first means is an automatic temperature control means comprising a temperature control element 3 such as a Peltier element on which important components such as the solid-state laser unit 1, the pumping light source 2 and like are placed, a temperature sensor 4 which detects the temperature of the important components and a temperature control circuit 5 which controls the temperature control element 3 on the basis of the temperature detected by the temperature sensor 4.

The second means is an automatic output control means comprising a photodetector 6 which detects a part of a laser beam 11 emitted from the solid-state laser unit 1 (split from the laser beam 11 by a half-silvered mirror 6a) and converts the intensity of the part of the laser beam 11 to an electric signal, a light output control circuit 7 which generates a feedback signal for changing the energy to be injected into the pumping light source 2 according to the level of the electric signal so that a desired light output of the solid-state laser unit 1 can be obtained, and a drive circuit 8 which provides energy to the pumping light source 2 under the control of the feedback signal (in this example, a circuit for applying an electric current to a semiconductor laser).

In this example, the laser beam 11 is a second harmonic which is obtained by wavelength conversion of a laser beam emitted from the solid laser medium 1a by the nonlinear optical crystal 1c.

The reason the automatic temperature control means and the automatic light output control means are required to stabilize the light output of the light emitting device shown in FIG. 3 will be described in detail hereinbelow.

Figure 4:
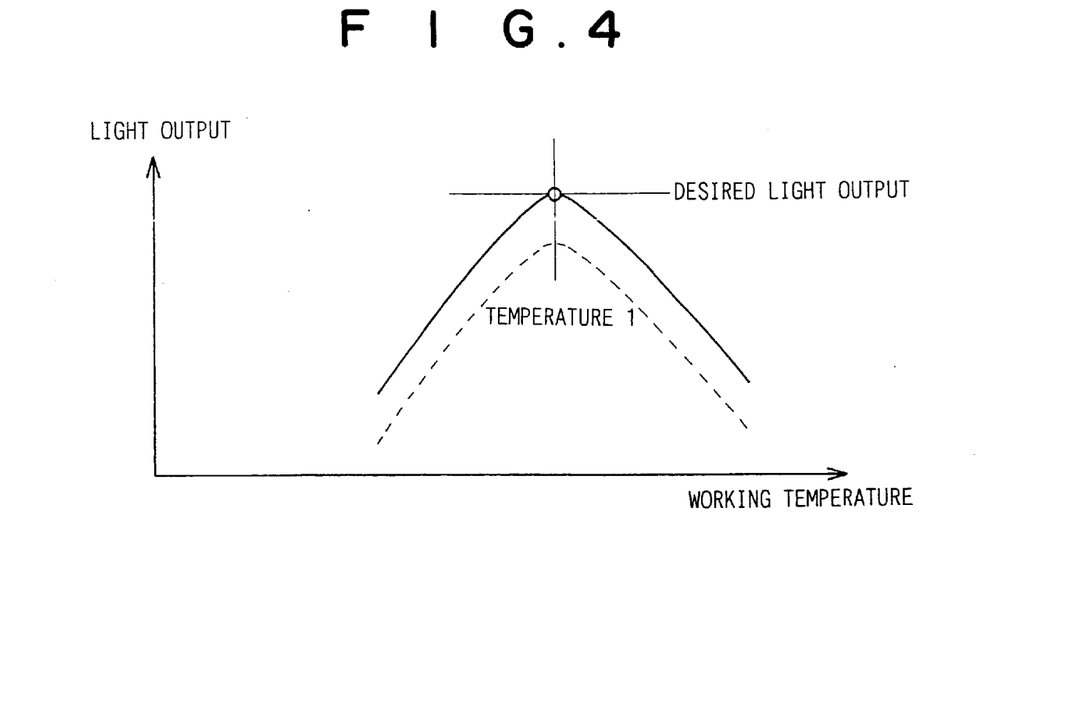
FIG. 4 is a graph showing the relation between the working temperature and the light output in a light emitting device having a semiconductor laser pumping light source.

In FIG. 4, change of the light output of the light emitting device when the temperature of the temperature control element 3 is changed with energy of a given level injected into the pumping light source 2 is shown by the solid line. As can be seen from FIG. 4, the light output of the light emitting device is often maximized at a particular working temperature. This is because the oscillating wavelength of the semiconductor laser, the wavelength conversion efficiency by the nonlinear optical crystal, and the like have great temperature-dependency.

Accordingly, unless the light emitting device is operated at an optimal temperature, larger energy must be injected into the pumping light source in order to obtain a light output of a given level, which can shorten the service life of the light emitting device. This is a reason the first means is required.

The relation between the working temperature and the light output of the light emitting device can change as shown by the broken line in FIG. 4 with age and/or with the ambient temperature. Accordingly, in order to compensate for the change with age and/or with the ambient temperature, the second means is required.

However, even with the first and second means, an attempt to obtain a stabilized high quality laser beam for a long period encounters the following difficulties.

Figure 5:
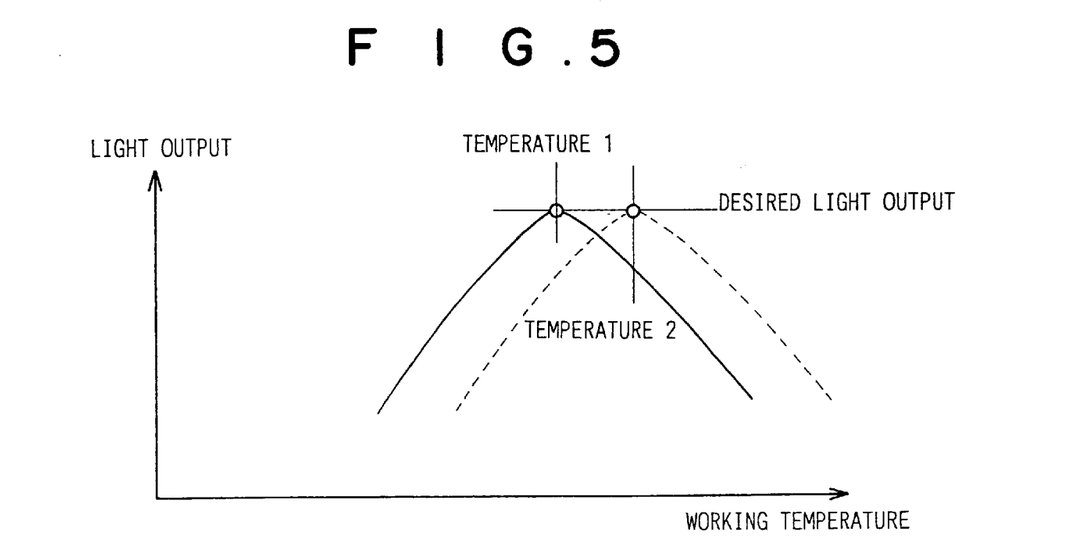
FIG. 5 is a graph showing change of the relation shown in FIG. 4.

That is, for example, the temperature of the temperature control element 3 at which the output of the light emitting device is maximized (temperature 1) changes with change of the ambient temperature and/or change with age of the components. The working temperature-light output properties can change as shown by the broken line in FIG. 5, and the temperature at which the output of the light emitting device is maximized can change from the temperature 1 to a temperature 2.

In such a case, when the automatic output control means is simply operated with the temperature of the temperature control element 3 fixed at the temperature 1, a larger drive current is apparently required to increase the output of the pumping light in order to obtain a desired light output of the light emitting device, which is greatly disadvantageous not only from the viewpoint of power consumption but also from the viewpoint of the service life of the light emitting device.

Accordingly, it is necessary to search for a new optimal temperature (the second temperature 2) somehow and to operate the automatic output control means at the new optimal temperature. There is disclosed in Japanese Unexamined Patent Publication No. 8(1996)-17106 a method of searching for a new optimal temperature and controlling the temperature of the important components to the new optimal temperature.

Figure 6:
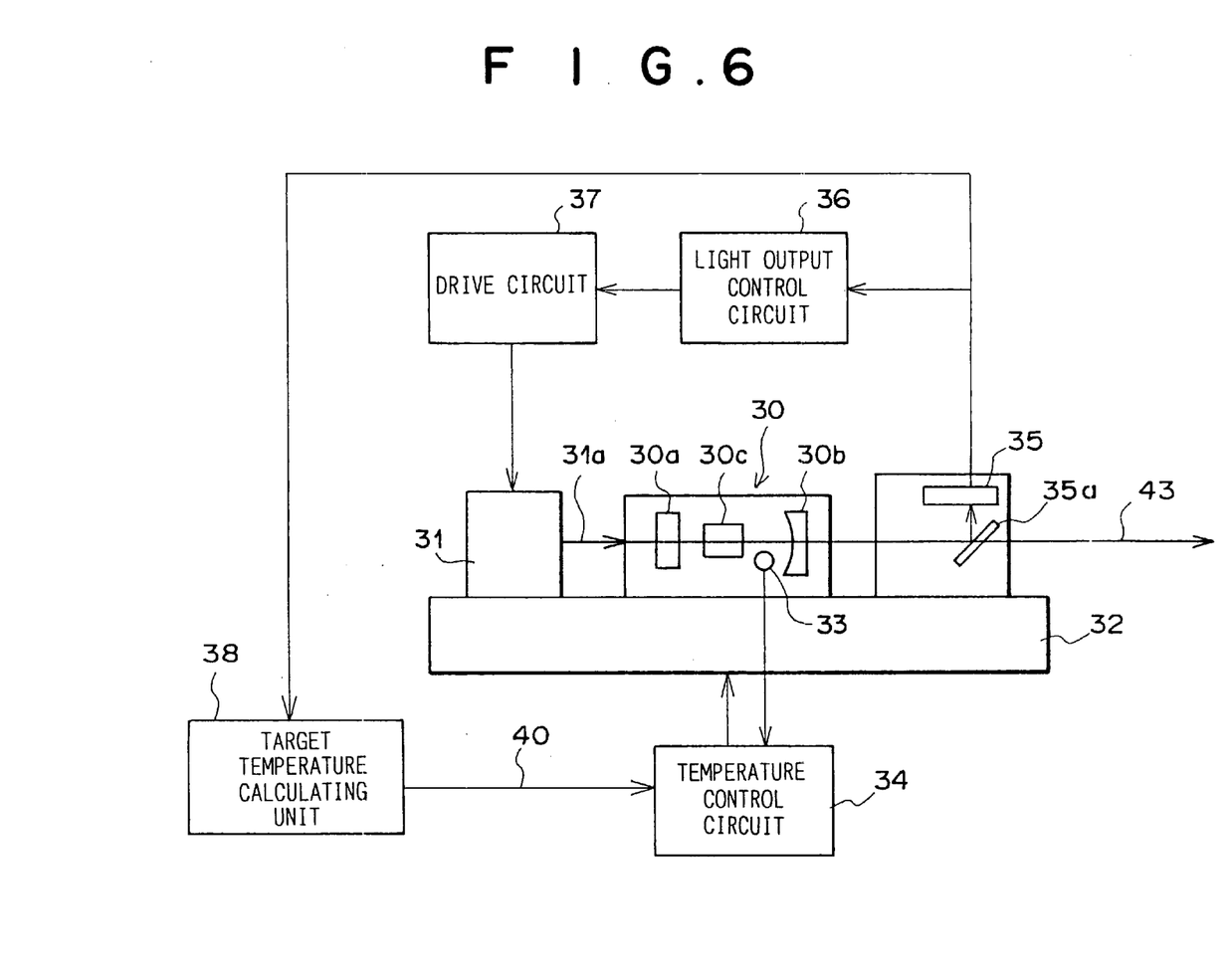
FIG. 6 is a schematic side view illustrating another conventional light emitting device.

The method will be described in detail with reference to FIG. 6 which shows a light emitting device for carrying out the method. As shown in FIG. 6, the light emitting device comprises a solid-state laser unit 30 formed of a solid laser medium 30a, a resonator mirror 30b, a nonlinear optical crystal 30c and the like, a pumping light source 31 such as a semiconductor laser which emits pumping light 31a for pumping the solid laser medium 30a, a temperature control element 32 such as a Peltier element which controls the temperature of the solid-state laser unit 30 and/or the pumping light source 31, a temperature sensor 33 which detects the temperature of the solid-state laser unit 30 and/or the pumping light source 31, a temperature control circuit 34 which controls the temperature control element 32 on the basis of the temperature detected by the temperature sensor 33 according to a temperature signal 40 representing a target temperature, a photodetector 35 which detects a part of a laser beam 43 emitted from the solid-state laser unit 30 (split from the laser beam 43 by a half-silvered mirror 35a) and converts the intensity of the part of the laser beam 43 to an electric signal, a light output control circuit 36 which generates a signal for controlling the energy to be supplied to the pumping light source 31 according to the level of the electric signal so that the output of the laser beam 43 is fixed, and a drive circuit 37 which supplies energy to the pumping light source 31 under the control of the signal from the light output control circuit 36.

The light emitting device is further provided with a target temperature calculating unit 38 which sweeps the temperature signal 40, stores the detecting signal of the photodetector 35 during the sweep of the temperature signal 40, calculates an optimal temperature on the basis of the relation between the temperature and the level of the detecting signal of the photodetector 35 (usually the temperature at which the level of the detecting signal of the photodetector 35 is maximized), and outputs a temperature signal 40 representing the optimal temperature (a target temperature).

In this example, the laser beam 43 is a second harmonic which is obtained by wavelength conversion of a laser beam emitted from the solid laser medium 30a by the nonlinear optical crystal 30c.

In the conventional light emitting device with the arrangement described above, temperature control is effected in the following two steps (step 1 and step 2) in order to stabilize the operation of the light emitting device.

Step 1: The light output control circuit 36 is first disconnected and a constant electric current is supplied to the pumping light source 31. In this state, the target temperature calculating unit 38 is caused to sweep the working temperatures of the solid-state laser unit 30 and the pumping light source 31 while detecting the output of the laser beam 43, and stores the relation between the working temperature and the light output.

Step 2: Thereafter, the target temperature calculating unit 38 determines the temperature at which the light output is maximized, and determines the temperature as the optimal temperature. Then the target temperature calculating unit 38 supplies a temperature signal 40 representing the optimal temperature to the temperature control circuit 34. After the temperature control circuit 34 starts the temperature control on the basis of the optimal temperature, the light output control means 36 is connected.

By effecting the optimization (the aforesaid steps 1 and 2) periodically or as desired and updating the optimal temperature, the light emitting device can be operated at a desired light output without supplying an excessive electric current to the pumping light source 31, whereby the light output can be stabilized without adversely affecting the service life of the solid laser medium.

However, the conventional light emitting device involves the following two problems and there has been a great demand for solving the problems.

That is, while the temperature sweep is being effected, the light output of the lied is not fixed and accordingly, the system provided with the light emitting device cannot work in a desired manner.

At the same time, it has been found that the optimal working temperature cannot be detected by the system of the conventional light emitting device for the following reason.

Figure 7:
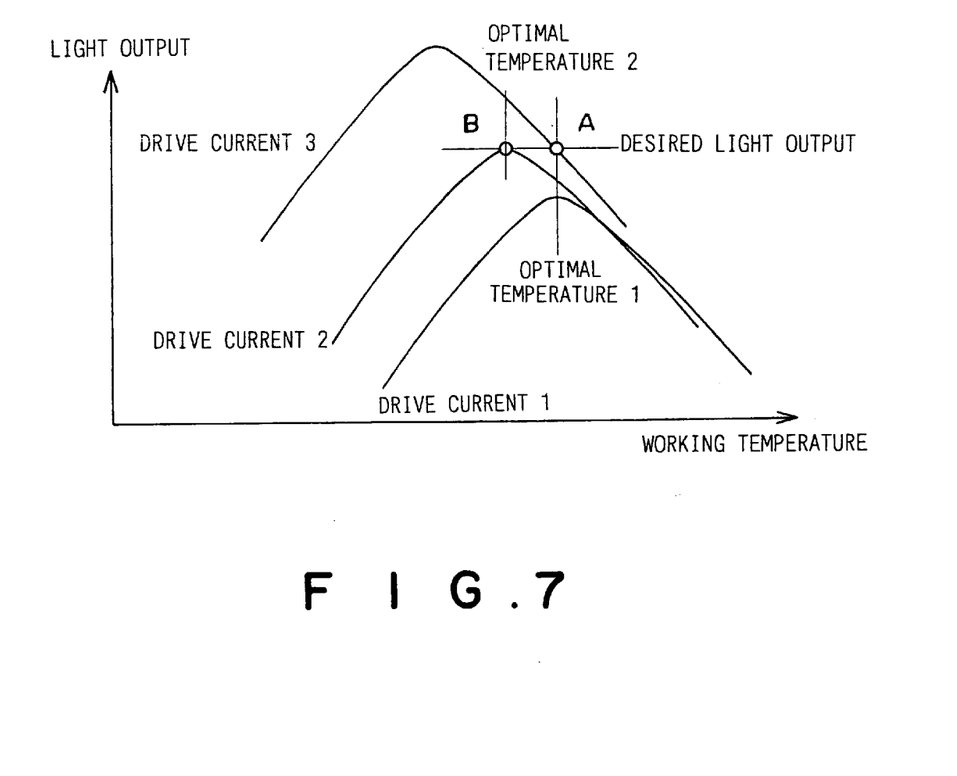
FIG. 7 is a graph showing the relation between the working temperature and the light output in the light emitting device shown in FIG. 6.

FIG. 7 shows the relation between the temperature of the temperature control element 32 and the light output of the laser beam 43 when the drive current supplied to the semiconductor laser (the pumping light source) is constant. In FIG. 7, it is assumed that drive current 1<drive current 2<drive current 3.

As can be understood from FIG. 7, as the drive current is increased, the maximum light output is increased and the working temperature at which the light output is maximized (will be referred to as "the optimal working temperature", hereinbelow) is lowered. The optimal working temperature often depends upon the drive current. This is because of the following reason.

That is, as the drive current supplied to a semiconductor laser is increased, the pumping light output of the semiconductor laser is increased. Since gain is generated by exposing the solid laser medium to the pumping light, there is a tendency for the light output of the solid-state laser to increase as the drive current is increased.

However, the oscillation wavelength of a semiconductor laser is generally apt to be increased as the drive current is increased and apt to be shortened as the working temperature is lowered. Further, the solid laser medium has a tendency to mainly absorb light at a particular wavelength.

This indicates that in order to obtain a high pumping efficiency when the light emitting device is operating at a high drive current, it is necessary to lower the working temperature so that the tendency for the oscillation wavelength to be increased is cancelled. In other words, the optimal working temperature is lowered as the drive current is increased.

Under these conditions, searching for the optimal working temperature by the conventional system is discussed. That is, it is first assumed that an optimal working temperature 1 is obtained by detecting the light output while driving the pumping light source with the drive current 1 (FIG. 7) and sweeping the temperatures. In this case, the working temperature is set at the temperature 1 and the automatic light output control means is caused to control the drive current so that a desired light output is obtained. As can be understood from FIG. 7, the drive current 3 is required in this case (action point A).

However, as can be understood from FIG. 7, the optimal conditions for obtaining the desired light output are the working temperature 2 and the drive current 2 (action point B). That is, in the conventional system, where the drive current 2 is sufficient, the drive current 3 is used. That is, an unnecessary large electric current is supplied to the semiconductor laser.

As can be understood from the description above, according to the conventional method of searching for the optimal working temperature, an optimal temperature for obtaining a desired light output cannot be accurately detected and an electric current more than necessary sometimes must be supplied to the semiconductor laser, which can shorten the service life of the light emitting device.

The term "the optimal temperature" means a temperature at which a desired light output can be obtained with a least drive current supplied to the pumping light source.

In the case where the beam diameter of the laser beam emitted from the solid-state laser unit and/or noise contained in the laser beam are detected and the working temperature is controlled so that the quality of the laser beam is optimized, it is sometimes difficult to set the working temperature at a temperature optimal to obtain a desired beam diameter as in the case where the working temperature is controlled according to the drive current.

SUMMARY OF THE INVENTION

In view of the foregoing observations and description, the primary object of the present invention is to provide a light emitting device which can obtain a desired light output with least pumping energy supplied to the pumping light source and accordingly is smaller in power consumption and longer in service life.

Another object of the present invention is to provide a light emitting device which can obtain a desired light output with the working temperature controlled so that the quality of the light beam (e.g., the beam diameter and the noise level) is optimized.

Still another object of the present invention is to provide a light emitting device which can normally operate with the light output kept constant even while the temperature-dependency of the pumping energy and the beam quality are measured and the level of the pumping energy and the working temperature are optimized.

That is, in accordance with a first aspect of the present invention, there is provided a light emitting device comprising a solid-state laser unit including a solid laser medium, a pumping light source which emits pumping light for pumping the solid laser medium, an automatic temperature control means including a temperature control element which controls the working temperature of at least one of the solid-state laser unit and the pumping light source to a target working temperature, a temperature sensor which detects the working temperature controlled by the temperature control element, and a temperature control circuit which controls the temperature control element on the basis of the temperature detected by the temperature sensor so that the working temperature converges on the target working temperature, and an automatic light output control means including a drive means which supplies pumping energy to the pumping light source, a photodetector which detects at least a part of light emitted from the solid-state laser unit and a light output control circuit which increases and reduces the pumping energy supplied by the drive means to the pumping light source according to a photo-detecting signal output from the photodetector so that a desired light output of the solid-state laser unit is obtained, wherein the improvement comprises an energy measuring means which measures the pumping energy supplied to the pumping light source, and a target working temperature setting means which changes the working temperature as controlled by the temperature control element with the light output as controlled by the automatic light output control means fixed, and obtains an optimal working temperature at which the pumping energy is optimized on the basis of the relation between the pumping energy measured by the energy measuring means and the working temperature when the working temperature as controlled by the temperature control element is changed with the light output as controlled by the automatic light output control means fixed, and sets the target working temperature, to which the working temperature of at least one of the solid-state laser unit and the pumping light source is controlled by the temperature control element, to the optimal working temperature.

It is preferred that the optimal working temperature be a temperature at which the pumping energy is minimized.

It is preferred that the target working temperature setting means be arranged so that when a first pumping energy is measured under a first target working temperature in a given time interval, the target working temperature is set to a second target working temperature higher than the first target working temperature while the pumping energy measured under the second target working temperature is taken as a second pumping energy, and to a third target working temperature lower than the first target working temperature while the pumping energy measured under the third target working temperature is taken as a third pumping energy, and one of the first to third target working temperatures corresponding to the most optimal or the second most optimal pumping energy is set to be a target working temperature for the next time interval.

The target working temperature setting means may be arranged to obtain the relation between the pumping energy and the working temperature when the working temperature of the temperature control element is swept and obtains the optimal working temperature on the basis of the relation between the pumping energy and the working temperature.

As the energy measuring means, an ammeter which measures the electric current supplied to the pumping light source may be employed.

In accordance with a second aspect of the present invention, there is provided a light emitting device comprising a solid-state laser unit including a solid laser medium, a pumping light source which emits pumping light for pumping the solid laser medium, an automatic temperature control means including a temperature control element which controls the working temperature of at least one of the solid-state laser unit and the pumping light source to a target working temperature, a temperature sensor which detects the working temperature controlled by the temperature control element, and a temperature control circuit which controls the temperature control element on the basis of the temperature detected by the temperature sensor so that the working temperature converges on the target working temperature, and an automatic light output control means including a drive means which supplies pumping energy to the pumping light source, a photodetector which detects at least a part of light emitted from the solid-state laser unit and a light output control circuit which increases and reduces the pumping energy supplied by the drive means to the pumping light source according to a photo-detecting signal output from the photodetector so that a desired light output of the solid-state laser unit is obtained, wherein the improvement comprises a beam quality measuring means which measures the quality of the light beam emitted from the solid-state laser unit, and a target working temperature setting means which changes the working temperature as controlled by the temperature control element with the light output as controlled by the automatic light output control means fixed, and obtains an optimal working temperature at which the beam quality is optimized on the basis of the relation between the beam quality measured by the beam quality measuring means and the working temperature when the working temperature as controlled by the temperature control element is changed with the light output as controlled by the automatic light output control means fixed, and sets the target working temperature, to which the working temperature of at least one of the solid-state laser unit and the pumping light source is controlled by the temperature control element, to the optimal working temperature.

It is preferred that the target working temperature setting means be arranged so that when a first beam quality is measured under a first target working temperature in a given time interval, the target working temperature is set to a second target working temperature higher than the first target working temperature while the beam quality measured under the second target working temperature is taken as a second beam quality, and to a third target working temperature lower than the first target working temperature while the beam quality measured under the third target working temperature is taken as a third beam quality, and one of the first to third target working temperatures corresponding to the most optimal or the second most optimal beam quality is set to be a target working temperature for the next time interval.

The target working temperature setting means may be arranged to obtain the relation between the beam quality and the working temperature when the working temperature of the temperature control element is swept and obtains the optimal working temperature on the basis of the relation between the beam quality and the working temperature.

As the beam quality measuring means, a beam diameter measuring means which measures the diameter of the beam emitted from the solid-state laser unit may be employed.

It is preferred that the pumping light source comprises a semiconductor laser.

In the light emitting device in accordance with the first aspect of the present invention, since the target working temperature setting means obtains an optimal working temperature at which the pumping energy is optimized on the basis of the relation between the pumping energy measured by the energy measuring means and the working temperature when the working temperature as controlled by the temperature control element is changed with the light output as controlled by the automatic light output control means fixed, and sets the target working temperature, to which the working temperature of at least one of the solid-state laser unit and the pumping light source is controlled by the temperature control element, to the optimal working temperature, the pumping energy can be minimized with the light output kept constant at a desired level, whereby power consumption of the light emitting device is suppressed and the service life of the light emitting device is elongated.

Further, since the target working temperature setting means changes the working temperature of the temperature control element while keeping constant the light output controlled by the automatic light output control means, the light output of the light emitting device can be held constant even while the optimal working temperature is searched for, and accordingly, the light emitting device can be optimized without interrupting the operation of the system using the light emitting device.

In the light emitting device in accordance with the second aspect of the present invention, since the target working temperature setting means obtains an optimal working temperature at which the beam quality is optimized on the basis of the relation between the beam quality measured by the beam quality measuring means and the working temperature when the working temperature as controlled by the temperature control element is changed with the light output as controlled by the automatic light output control means fixed, and sets the target working temperature, to which the working temperature of at least one of the solid-state laser unit and the pumping light source is controlled by the temperature control element, to the optimal working temperature, the beam quality can be optimized with the light output kept constant at a desired level.

Further, since the target working temperature setting means changes the working temperature of the temperature control element while keeping constant the light output controlled by the automatic light output control means, the light output of the light emitting device can be held constant even while the optimal working temperature is searched for, and accordingly, the beam quality can be optimized without interrupting the operation of the system using the light emitting device.

DESCRIPTION OF THE PREFERRED EMBODIMENTS

Figure 1:
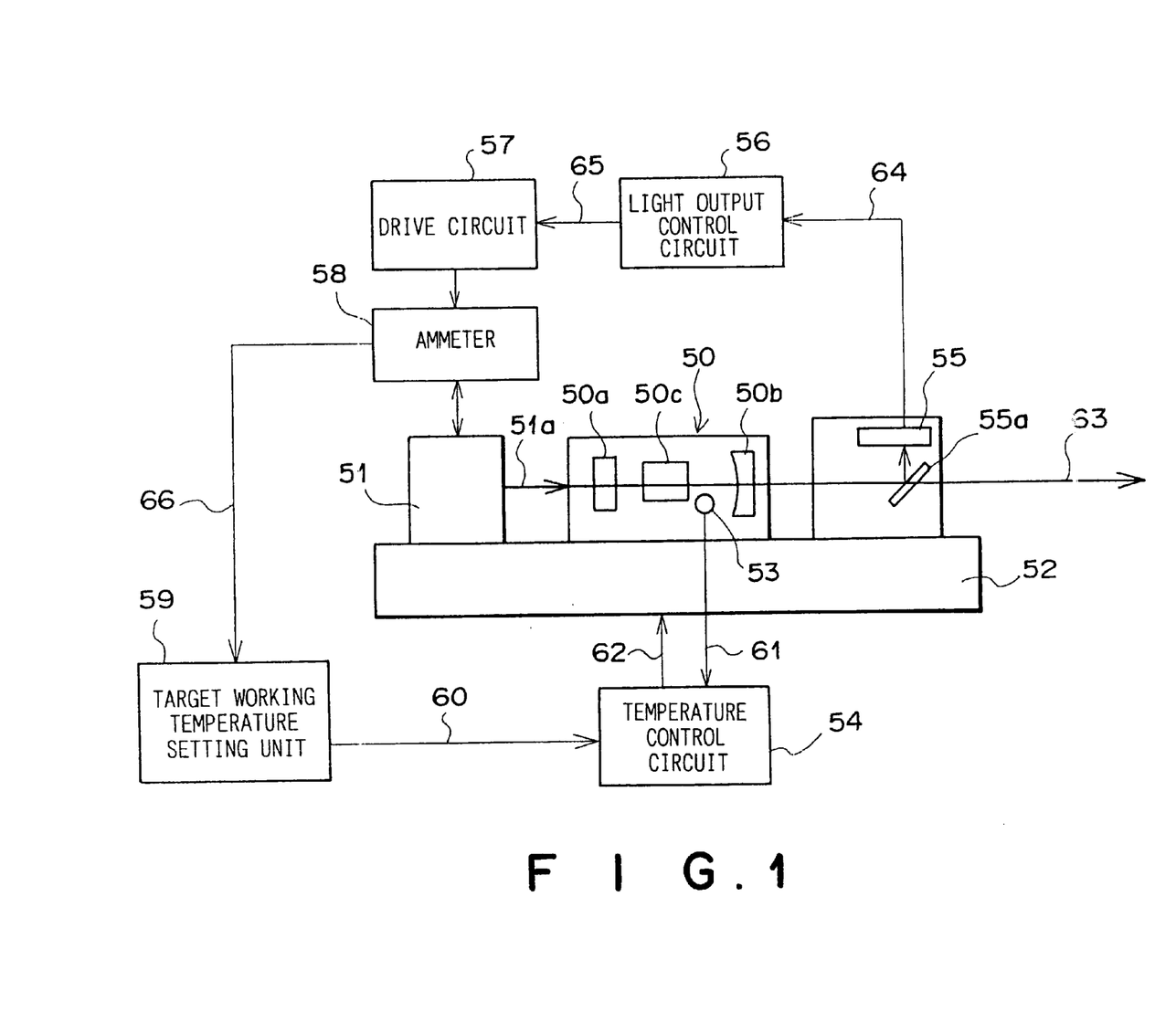
FIG. 1 is a schematic side view for illustrating a light emitting device in accordance with a first embodiment of the present invention.

In FIG. 1, a light emitting device in accordance with a first embodiment of the present invention comprises a solid-state laser unit 50 including in combination a solid laser medium 50a, a resonator mirror 50b, a nonlinear optical crystal 50c and the like, a pumping light source 51, which may comprise, for instance, a semiconductor laser, a temperature control element 52, which may comprise, for instance, a Peltier element and on which important components such as the solid-state laser unit 50, the pumping light source 51 and the like are placed, a temperature sensor 53 which may comprise, for instance, a platinum resistance element and detects the working temperature of the components whose temperature is controlled by the temperature control element 52, a temperature control circuit 54 which supplies temperature control power 62 to the temperature control element 52 on the basis of the temperature detecting signal 61 output from the temperature sensor 53 and a target working temperature signal 60 representing a target working temperature, a photodetector 55 which detects a part of a laser beam 63 emitted from the solid-state laser unit 50 (split from the laser beam 63 by a half-silvered mirror 55a) and converts the intensity of the part of the laser beam 63 to an electric signal, a light output control circuit 56 which generates a feedback signal 65 for controlling the energy to be supplied to the pumping light source 51 according to the level of the electric signal 64 output from the photodetector 55 so that a desired light output can be obtained from the solid-state laser unit 50, a drive circuit 57 which supplies energy (electric current in this particular embodiment) to the pumping light source 51 under the control of the feedback signal 65, an ammeter 58, and a target working temperature setting unit 59 which generates the aforesaid target working temperature signal 60.

The target working temperature setting unit 59 comprises a microcomputer. The target working temperature setting unit 59 receives from the ammeter 58 a signal 66 representing the drive current supplied to the pumping light source 51 and stores the drive current corresponding to the working temperature while changing the working temperature as controlled by the temperature control circuit 54, and obtains an optimal working temperature by carrying out the following operations, and sets the target working temperature at the optimal working temperature. Then the target working temperature setting unit 59 inputs a target working temperature signal 60 representing the target working temperature (equal to the optimal working temperature thus determined) into the temperature control circuit 54.

In this particular embodiment, the solid laser medium 50*a* is, for instance, a YAG crystal doped with neodymium (Nd), the nonlinear optical crystal 50*c* is a MgO—LN crystal which has periodic domain reversals and converts a solid laser beam oscillated by the solid laser medium 50*a* at a wavelength of 946 nm to its second harmonic at a wavelength of 473 nm (the laser beam 63), and the resonator mirror 50*b* has a high reflectivity to the solid laser beam at 946 nm while transmitting the laser beam 63 at 473 nm. The other resonator mirror is formed by applying a predetermined coating on the pumping light source side end face of the solid laser medium 50*a*.

Operation of the light emitting device of the first embodiment will be described, hereinbelow. The solid laser medium 50*a* is pumped by the pumping light 51*a* at a wavelength of 808 nm emitted from the pumping light source 51 and generates fluorescence at a wavelength of 946 nm. The fluorescence resonates in the resonator formed by the solid laser medium 50*a* and the resonator mirror 50*b* and a solid laser beam at a wavelength of 946 nm is oscillated. The laser beam is converted to a laser beam 63 at a wavelength of 473 nm (to its second harmonic) by the nonlinear optical crystal 50*c*. The laser beam 63 is radiated through the resonator mirror 50*b* and is used for various applications.

A part of the laser beam 63 is split from the laser beam 63 by a half-silvered mirror 55*a* and the intensity of the split part is detected by the photodetector 55. The light output control circuit 56 generates a feedback signal 65 according to the level of the electric signal 64 output from the photodetector 55, and the drive circuit 57 controls the energy to be supplied to the pumping light source 51 (drive current in this particular embodiment) according to the feedback signal 65, whereby the light output of the solid-state laser unit 50 is kept at a desired constant value.

The temperature in the resonator is detected by the temperature sensor 53 and the temperature detecting signal 61 output from the temperature sensor 53 is input into the temperature control circuit 54. The temperature control circuit 54 supplies temperature control power 62 to the temperature control element 52 on the basis of the temperature detecting signal 61 output from the temperature sensor 53 and the target working temperature signal 60 output from the target working temperature setting unit 59.

The processing for obtaining the target working temperature (=the optimal working temperature) will be described with reference to FIG. 2, which shows the relation between the working temperature and the drive current. In this particular embodiment, the optimal working temperature is searched for in the following steps (1), and (2).

Figure 2:
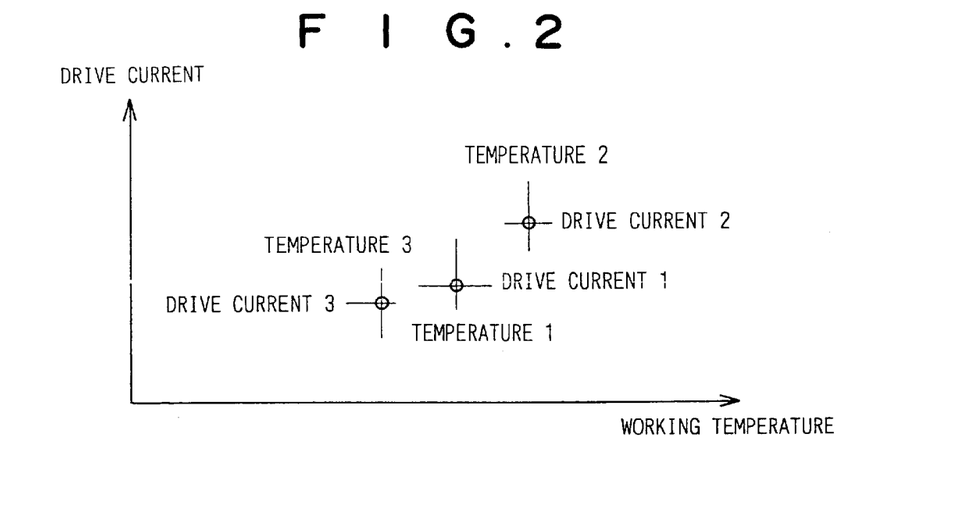
FIG. 2 is a schematic view showing the relation between the working temperature and the drive current.

(1) Each time the light emitting device is started, the target working temperature setting unit 59 causes the temperature control circuit to start the temperature control using as an initial temperature the temperature set as the target working temperature in the last operation (temperature 1 in FIG. 2).

At this time, the light output control circuit 56 is also operated to cause the solid-state laser unit 50 to operate at a desired light output, and the target working temperature setting unit 59 stores the drive current detected by the ammeter 58 at that time as drive current 1. At this time, the light emitting device operates at the desired light output and accordingly, the system using the light emitting device can normally operates though there is fear that the working conditions of the light emitting device are not optimal.

(2) After the lapse of a proper time, the target working temperature setting unit 59 shifts upward the target working temperature to a temperature 2, measures the drive current at the temperature 2, and stores the measured drive current as dive current 2. The desired light output is kept obtained also during these operations. When the drive current 2 is smaller than the drive current 1, then the target working temperature setting unit 59 sets the temperature 2 as a new target working temperature, whereas when the drive current 2 is larger than the drive current 1, then the target working temperature setting unit 59 sets the target working temperature to a temperature 3 lower than the temperature 1, measures the drive current at the temperature 3, and stores the measured drive current as dive current 3.

When the drive current 3 is smaller than the drive current 1, then the target working temperature setting unit 59 sets the temperature 3 as a new target working temperature, whereas when the drive current 3 is larger than the drive current 1, then the target working temperature setting unit 59 sets the target working temperature to the temperature 1.

By repeating the steps (1) and (2), the drive current for the pumping light source 51 (a semiconductor laser) is minimized, that is, set to the smallest of the drive currents 1, 2 and 3, whereby power consumption of the pumping light source 51 is suppressed and the service life of the light emitting device is elongated.

At the same time, since the light output of the light emitting device is kept constant even during optimization of the drive current, the system using the light emitting device can be kept normally operated.

It is preferred that the target working temperature be shifted up and down for searching for the optimal working temperature about 0.2° C. by 0.2° C. and that the target working temperature be updated at intervals of about minutes. Though being first shifted up in the embodiment described, the initial target working temperature may be first shifted down.

Further, though, in the embodiment described above, the present invention is applied to a light emitting device having a semiconductor laser pumping light source, the present invention may be applied to light emitting devices having a pumping light source other than a semiconductor laser.

As the method of searching for the optimal working temperature, a method in which the optimal working temperature is searched for by sweeping temperatures within a predetermined temperature range (continuously changing the target working temperature within a predetermined temperature range) and determining a temperature at which the drive current is optimized (normally minimized) may be employed. Also, in this method, the desired light output can be kept obtained even during the temperature sweep and accordingly the system using the light emitting device can be kept normally operated.

In the case where the optimal working temperature is determined by the temperature sweep, the optimal working temperature may be determined, for instance, to be a median of temperatures at which the drive current is higher than the minimum value by 5% or so instead of the temperature at which the drive current is minimized.

Further, though, in the embodiment described above, a Nd:YAG crystal is used as the solid laser medium, other solid laser media such as a semiconductor may be employed. Further, also the nonlinear optical crystal need not be limited to a MgO—LN crystal but may be other various nonlinear crystals such as a BBO crystal.

The present invention may be applied not only to a light emitting device in which the solid laser beam is converted to its second harmonic but also to those which require temperature control because of their components having great temperature-dependency such as those employing a down-conversion type solid laser, a solid laser in which a sum frequency is obtained with the solid laser beam taken as a fundamental wave, or a solid laser in which the solid laser beam is converted to its third harmonic.

Though, in the embodiment described above, the energy supplied to the pumping light source is employed as the physical value to be optimized, a detector for detecting a physical value other than the light output may be provided and the working temperature may be optimized so that the physical value is optimized.

Figure 8:
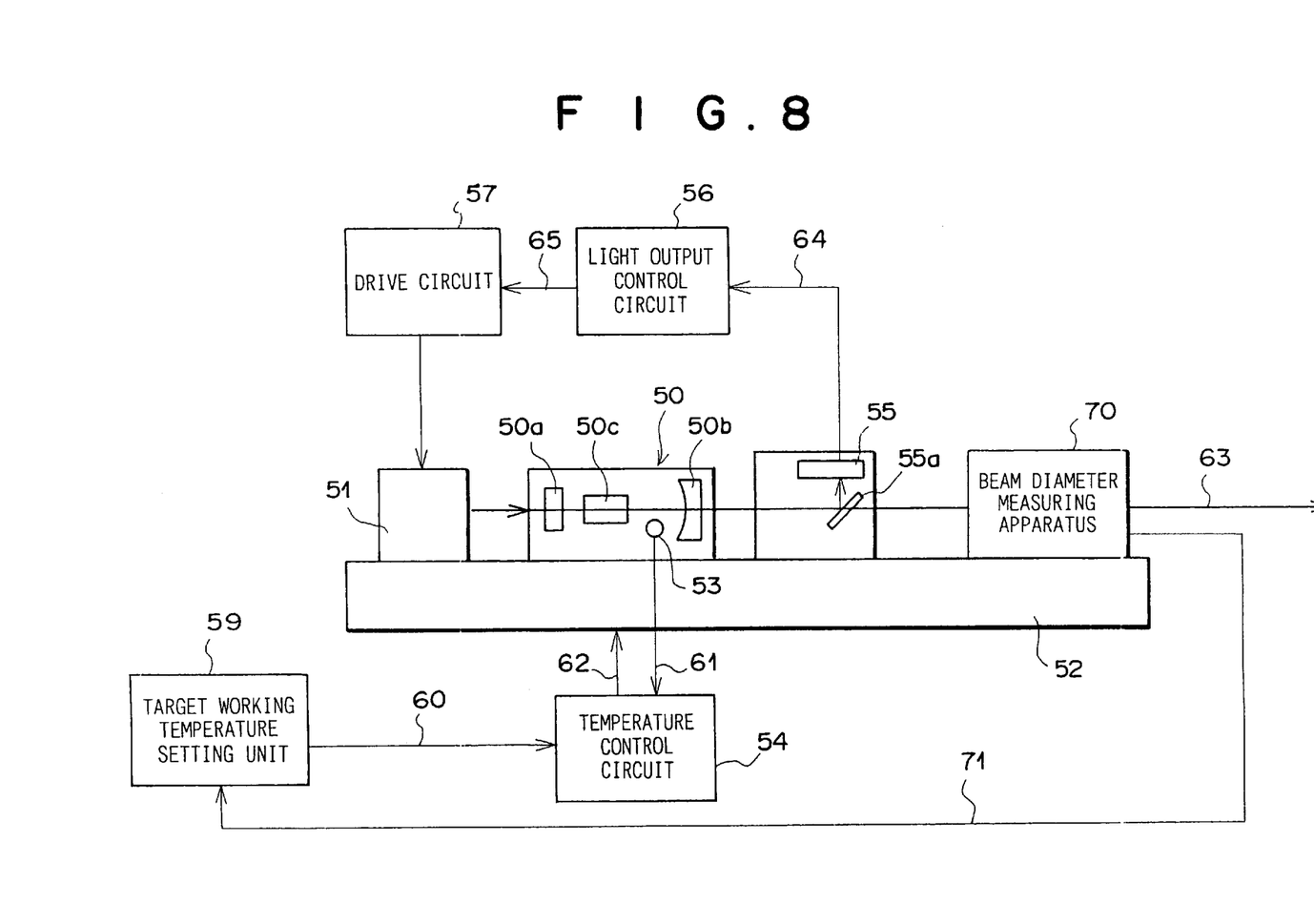
FIG. 8 is a schematic side view for illustrating a light emitting device in accordance with a second embodiment of the present invention.

For example, as a physical value other than the light output, beam quality (e.g., noise contents in the beam or the beam diameter) may be employed. In the light emitting device in accordance with a second embodiment of the present invention shown in FIG. 8, the beam diameter is detected and optimized. The light emitting device of the second embodiment will be described hereinbelow. In FIG. 8, those analogous to the elements shown in FIG. 1 are given the same reference numerals and will not be described, here.

The light emitting device shown in FIG. 8 differs from that shown in FIG. 1 in that a beam diameter measuring apparatus 70 for measuring the diameter of the laser beam 63 is provided in place of the ammeter 58. The beam diameter measuring apparatus 70 outputs a beam diameter signal 71 representing the measured diameter of the laser beam 63 and the beam diameter signal 71 is input into the target working temperature setting unit 59.

Also in the second embodiment, an optimal working temperature at which a laser beam 63 of a target beam diameter is generated can be obtained by the target working temperature setting means 59 with the light output of the solid-state laser unit 50 fixed by the light output control circuit 56 on the basis of the relation between the beam diameter signal 71 output from the beam diameter measuring apparatus 70 and the working temperature. By inputting a working temperature signal 60 representing the optimal working temperature to the temperature control circuit 54, the temperature control element 52 can be operated on the basis of the optimal temperature.

In addition, all of the contents of Japanese Patent Application No. 11(1999)-349728 are incorporated into this specification by reference.

What is claimed is:

1. A light emitting device comprising
   a solid-state laser unit including at least a solid laser medium,
   a pumping light source which emits pumping light for pumping the solid laser medium,
   an automatic temperature control means including a temperature control element which controls the working temperature of at least one of the solid-state laser unit and the pumping light source to a target working temperature, a temperature sensor which detects the working temperature controlled by the temperature control element, and a temperature control circuit which controls the temperature control element on the basis of the temperature detected by the temperature sensor so that the working temperature converges on the target working temperature, and
   an automatic light output control means including a drive means which supplies pumping energy to the pumping light source, a photodetector which detects at least a part of light emitted from the solid-state laser unit and a light output control circuit which increases and reduces the pumping energy supplied by the drive means to the pumping light source according to a photo-detecting signal output from the photodetector so that a desired light output of the solid-state laser unit is obtained, wherein the improvement comprises
   an energy measuring means which measures the pumping energy supplied to the pumping light source, and
   a target working temperature setting means which changes the working temperature as controlled by the temperature control element with the light output as controlled by the automatic light output control means fixed, and obtains an optimal working temperature at which the pumping energy is optimized on the basis of the relation between the pumping energy measured by the energy measuring means and the working temperature when the working temperature as controlled by the temperature control element is changed with the light output as controlled by the automatic light output control means fixed, and sets the target working temperature, to which the working temperature of at least one of the solid-state laser unit and the pumping light source is controlled by the temperature control element, to the optimal working temperature.

2. A light emitting device as defined in claim 1 further comprising a nonlinear optical crystal.

3. A light emitting device as defined in claim 1 in which the optimal working temperature is a temperature at which the pumping energy is minimized.

4. A light emitting device as defined in claim 1 in which the target working temperature setting means is arranged so that when a first pumping energy is measured under a first target working temperature in a given time interval, the target working temperature is set to a second target working temperature higher than the first target working temperature while the pumping energy measured under the second target working temperature is taken as a second pumping energy, and to a third target working temperature lower than the first target working temperature while the pumping energy measured under the third target working temperature is taken as a third pumping energy, and one of the first to third target working temperatures corresponding to the most optimal or the second most optimal pumping energy is set to be a target working temperature for the next time interval.

5. A light emitting device as defined in claim 1 in which the target working temperature setting means is arranged to obtain the relation between the pumping energy and the working temperature when the working temperature of the temperature control element is swept and obtains the optimal working temperature on the basis of the relation between the pumping energy and the working temperature.

6. A light emitting device as defined in claim 1 in which the energy measuring means is an ammeter which measures the electric current supplied to the pumping light source.

7. A light emitting device as defined in claim 1 in which the pumping light source comprises a semiconductor laser.

8. A light emitting device comprising
a solid-state laser unit including at least a solid laser medium,
a pumping light source which emits pumping light for pumping the solid laser medium,
an automatic temperature control means including a temperature control element which controls the working temperature of at least one of the solid-state laser unit and the pumping light source to a target working temperature, a temperature sensor which detects the working temperature controlled by the temperature control element, and a temperature control circuit which controls the temperature control element on the basis of the temperature detected by the temperature sensor so that the working temperature converges on the target working temperature, and
an automatic light output control means including a drive means which supplies pumping energy to the pumping light source, a photodetector which detects at least a part of light emitted from the solid-state laser unit and a light output control circuit which increases and reduces the pumping energy supplied by the drive means to the pumping light source according to a photo-detecting signal output from the photodetector so that a desired light output of the solid-state laser unit is obtained, wherein the improvement comprises
a beam quality measuring means which measures the quality of the light beam emitted from the solid-state laser unit, and
a target working temperature setting means which changes the working temperature as controlled by the temperature control element with the light output as controlled by the automatic light output control means fixed, and obtains an optimal working temperature at which the beam quality is optimized on the basis of the relation between the beam quality measured by the beam quality measuring means and the working temperature when the working temperature as controlled by the temperature control element is changed with the light output as controlled by the automatic light output control means fixed, and sets the target working temperature, to which the working temperature of at least one of the solid-state laser unit and the pumping light source is controlled by the temperature control element, to the optimal working temperature.

9. A light emitting device as defined in claim 8 further comprising a nonlinear optical crystal.

10. A light emitting device as defined in claim 8 in which the target working temperature setting means is arranged so that when a first beam quality is measured under a first target working temperature in a given time interval, the target working temperature is set to a second target working temperature higher than the first target working temperature while the beam quality measured under the second target working temperature is taken as a second beam quality, and to a third target working temperature lower than the first target working temperature while the beam quality measured under the third target working temperature is taken as a third beam quality, and one of the first to third target working temperatures corresponding to the most optimal or the second most optimal beam quality is set to be a target working temperature for the next time interval.

11. A light emitting device as defined in claim 8 in which the target working temperature setting means is arranged to obtain the relation between the beam quality and the working temperature when the working temperature of the temperature control element is swept and obtains the optimal working temperature on the basis of the relation between the beam quality and the working temperature.

12. A light emitting device as defined in claim 8 in which the beam quality measuring means is a beam diameter measuring means which measures the diameter of the beam emitted from the solid-state laser unit.

13. A light emitting device as defined in claim 8 in which the pumping light source comprises a semiconductor laser.

14. A light emitting device as defined in claim 1 wherein the working temperature is an ambient temperature in a resonating cavity of said solid-state laser unit.

15. A light emitting device as defined in claim 8 wherein the working temperature is an ambient temperature in a resonating cavity of said solid-state laser unit.

16. A light emitting device as defined in claim 1 wherein the optimal working temperature is determined to be a median of temperatures at which a drive current driving said driving means is higher than a minimum detected drive current value by five percent.

17. A light emitting device as defined in claim 8 wherein the optimal working temperature is determined to be a median of temperatures at which a drive current driving said driving means is higher than a minimum detected drive current value by five percent.

18. A light emitting device as defined in claim 1 in which the target working temperature setting means is arranged so that in a given time interval, when a first pumping energy is measured under a first target working temperature, the target working temperature is set to a plurality of subsequent target working temperatures, at least one of said subsequent target working temperatures being greater than the first target working temperature and at least one of said subsequent target working temperatures being less than the first target working temperature, wherein the pumping energy is measured at each of said subsequent target working temperatures, and the one of the first or subsequent target working temperatures closest to the optimal pumping energy is set to the target working temperature for the next time interval.

19. A light emitting device as defined in claim 8 in which the target working temperature setting means is arranged so that in a given time interval, when a first beam quality is measured under a first target working temperature, the target working temperature is set to a plurality of subsequent target working temperatures, at least one of said subsequent target working temperatures being greater than the first target working temperature and at least one of said subsequent target working temperatures being less than the first target working temperature,
wherein the beam quality is measured at each of said subsequent target working temperatures, and the one of the first or subsequent target working temperatures closest to the optimal beam quality is set to the target working temperature for the next time interval.

* * * * *